Figure 1:
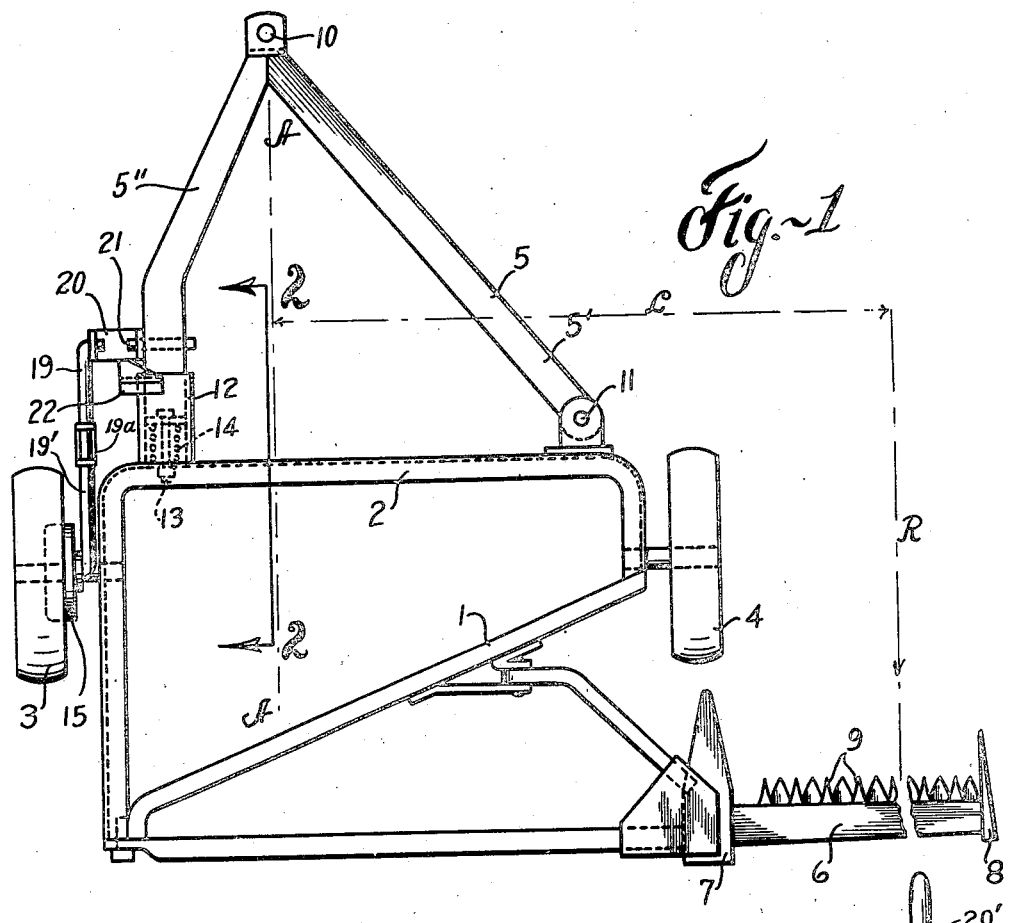

June 28, 1949. W. VUTZ 2,474,445
SIDEDRAFT STABILIZER MECHANISM
Filed June 12, 1944

INVENTOR.
Wilhelm Vutz
BY J. L. Walker
ATTORNEY.

Patented June 28, 1949

2,474,445

UNITED STATES PATENT OFFICE 2,474,445

SIDE DRAFT STABILIZER MECHANISM

Wilhelm Vutz, Coldwater, Ohio, assignor, by mesne assignments, to Avco Manufacturing Corporation, a corporation of Delaware Application June 12, 1944, Serial No. 539,897

8 Claims. (Cl. 56—321)

This invention pertains to side draft agricultural implements, vehicles and other traveling units, having laterally extending out rigger sections subject to resistance to their advancement, and more particularly to a stabilizing mechanism to minimize side shift or skidding of the machine or vehicle incident to unbalanced resistance to its travel movement.

For illustrative purpose, but with no intent of limiting the scope or application of the invention, it is herein shown and described as applied to a conventional agricultural mower, comprising a chassis upon which the operating mechanism is mounted, from which laterally extends a cutter bar assembly which is subject to decided side swinging influence about its draft point or hitch to a tractor by the unbalanced resistance of uncut growth against which the cutter bar operates in laterally offset relation with the line of draft.

Resistance or stability in a direction at right angles to the line of draft against the lateral swinging tendency of the entire machine under such influence is ordinarily afforded only by the frictional engagement of the mower ground wheels and the cutter bar with the ground. The side shift incident to unbalanced resistance encountered by the cutter bar assembly occurs simultaneously with the advancement of the machine, and is thus, to some extent, facilitated by the continuing rotation of the carrying wheels.

The resistance to side shifting movement being directly proportionate to the weight of the machine ordinarily necessitates that certain minimum weight be incorporated in the machine to enable it to withstand side shifting motion under ordinary operating conditions.

For reasons of economy of manufacture and operation, it is desirable that the weight of such machines be minimized below that necessary to afford stability and resistance against side shift or skidding under adverse operating conditions.

The present construction is designed to produce ample stability and resistance against side shifting motion in instances wherein the inherent weight of the machine is insufficient to do so, by providing automatic braking action upon the carrying wheels of the machine at the side toward which the machine tends to side shift. In lieu of automatic brake application, manual control may be employed.

The object of the invention is to improve the construction as well as the means and mode of operation of side draft implements and vehicles, whereby they may not only be simple in construction and economically manufactured, but will be efficient in use, automatic in operation, uniform in action, having relatively few operating parts, and be unlikely to get out of repair.

A further object of the invention is to minimize side slip or shifting motion of implements and vehicles out of direct line of draft, incident to unbalanced resistance to advancement thereof.

A further object of the invention is to enable the weight of implements and vehicles to be safely reduced beyond that ordinarily required to resist side slip incident to unequalized resistance to travel motion.

A further object of the invention is to provide automatic brake mechanism operative under the side slip or skidding influence to increase the frictional resistance of the machine to such action.

A further object of the invention is to provide a stabilizing mechanism having the advantageous structural features and inherent meritorious characteristics, and mode of operation herein set forth.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the drawings wherein is illustrated the preferred, but obviously not necessarily the only form of embodiment of the invention, Fig. 1 is a top plan view of a conventional mowing machine, with sundry operating parts omitted, to which the present invention has been applied.

Figure 2:
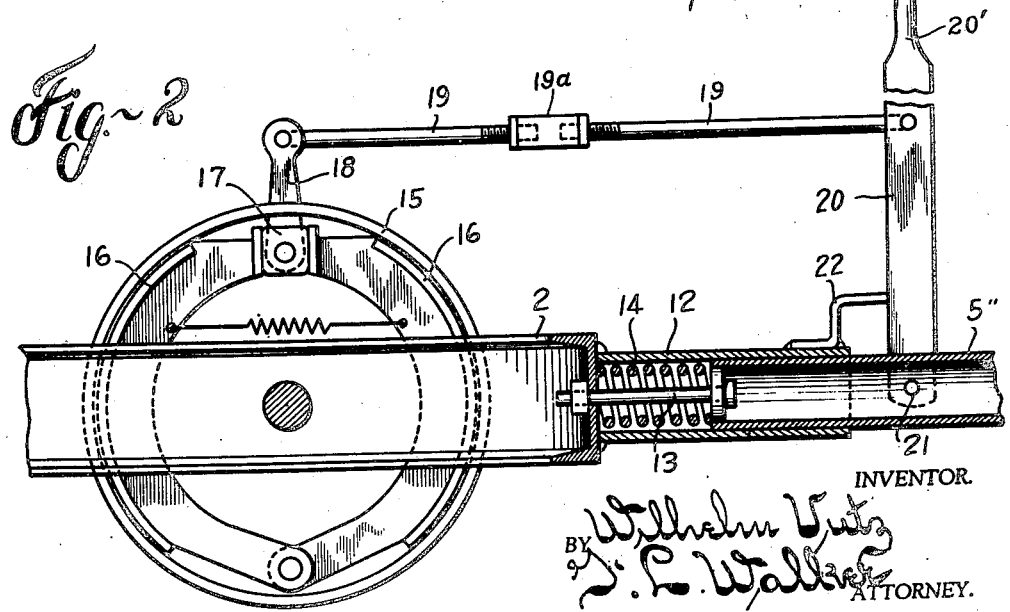

Fig. 2 is a side elevation, partly in section of the brake operating mechanism forming a part of the invention.

Referring to the drawings, 1 is the chassis of a conventional mowing machine of which 2 is the frame, 3 and 4 are ground wheels or carrying wheels journaled to the main frame 2, and 5 is a reach or draft tongue by which the machine may be hitched to a tractor or the like.

Extending laterally from the chassis 1 is an outrigger style cutter bar 6 having at its inner end the usual supporting shoe 7 and at its outer end a divider wing 8. Projecting from the front of the cutter bar are spaced guard fingers 9, across the intervening spaces between which a cutter knife is reciprocated to sever the vegetable growth against which the cutter bar assembly is drawn by the advance of the machine.

As illustrated in Fig. 1 the cutter bar assembly extends laterally far from the line of draft A—A of the machine. Consequently resistance to travel movement of the cutter bar by tough growth or an obstacle is amplified through the leverage RXL illustrated diagrammatically upon Fig. 1, wherein R represents the cutter bar reaction, and tends to cause the entire machine to side slip toward the left of Fig. 1 about the hitch point 10 as a center. If the machine was of sufficient weight to resist such side shifting leverage afforded by the extended cutter bar, the machine would hold its course without assistance, and the present braking feature would be unnecessary.

However the inclination in the industry has been to reduce the weight by economizing material wherever possible and the present machines are of light weight construction and hence unable to withstand the side shifting or skidding influence.

To increase the normal resistance of the machine to such deflection from its course, a braking mechanism is applied to the left carrying wheel 3, as illustrated in the drawing, i. e. that on the side opposite the laterally extending cutter bar 6, which is the direction in which the machine will tend to skid upon encountering resistance to the cutter bar. Such construction is best illustrated in Fig. 2.

One arm 5' of the draft reach is pivoted at 11 to the chassis frame 2. The opposite divergent arm 5" of the V shaped reach is capable of limited reciprocatory movement through a quite short range within a guide sleeve or socket 12 projecting from the frame 2 at the side adjacent the carrying wheel 3. The arm 5" has draft connection with the frame 2 within the socket 12, by means of a tie bolt 13 which is longitudinally slidable relative to either the chassis frame 2 or the arm 5". The movement of the arm 5" within the socket 12 is yieldingly resisted by a helical spring 14 surrounding the draft stud or tie bolt 13. The draft influence is transmitted from the reach or tongue 5 directly to the chassis through the pivotal connection 11 at one side and through the bolt 13 at the opposite side. The machine chassis is permitted a limited initial oscillatory motion about the pivot 11 against the tension of the spring 14 upon the initial skidding action of the machine, subsequent to which any further side swing would occur about the hitch point 10 of the tongue as a center. It is this subsequent swinging motion which is retarded by the present brake mechanism, which is set by the initial pivotal motion of the chassis about the point 11.

Mounted relative to the carrying wheel 3 is a conventional brake mechanism of the internal expanding type comprising a brake drum 15 internally engaged by expansible brake shoes 16 under influence of an interposed oscillatory cam head 17 connected to a brake arm 18. Interconnecting the brake arm 18 and actuating lever 20 pivoted at 21 to the arm 5" of the reach or tongue is an adjustable link 19—19', the sections of which are adjustably interconnected by a turnbuckle 19a. The lever 20, preferably but not necessarily extends above its point of connection with the link 19 and is provided with a handle 20' for manual manipulation. To effect automatic operation of the brake incident to initial side slip of the machine, there is provided upon the sleeve or socket 12 a forwardly projecting finger 22 which engages the operating lever in spaced relation with its pivot 21.

Under manual operation the lever 20 fulcrums upon its pivot 21 to draw the link 19 forwardly and thereby oscillate the brake arm 18 and its cam head 17 to expand the brake shoes. However upon side skid of the machine, incident to resistance encountered by the cutter bar, the same forward movement of the lever is effected by pressure of the finger 22 against the lever, with exactly the same effect. The difference is in the degree of leverage afforded. For manual operation much greater leverage is provided to enable brake operation with minimum effort. The operating pressure of the machine frame incident to side slip or swinging motion being much greater, the leverage is greatly reduced, but is ample to effectively set the brake mechanism and increase the frictional resistance to the side slip of the machine. It will be understood that when such movement occurs the machine is in motion, being drawn forward by the tractor or other draft means. The setting of the brake locks the wheel 3 against rotation, thus increasing its frictional contact with the ground.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. An agricultural mower or the like of the type wherein a cutter bar assembly extends laterally in outrigger relation from a wheeled chassis and is subject to unbalanced resistance to its travel movement by which the chassis is subjected to laterally deflecting influence from its normal path of travel, characterized by a sidedraft stabilizer, including a substantially V-shaped tongue for attachment to a draft unit, a pivotal joint connecting one of the arms of the V-shaped tongue with the chassis, a telescopic joint connecting the other arm of the V-shaped tongue with the chassis, a spring against the yielding resistance of which the last mentioned arm of the tongue is movable about the pivotal joint of the other arm, a wheel brake on the chassis, an operating lever therefor mounted upon the telescopic arm of the tongue, a link operatively connecting the lever with the brake mechanism, and a portion upon the chassis engageable with the lever upon telescopic movement of the tongue arm and the chassis for automatically setting the brake mechanism upon relative telescopic movement of the chassis and arm.

2. An agricultural mower or the like of the type wherein a wheeled chassis carries a laterally extending outrigger type cutter bar against which is exerted an unbalanced resistance to travel motion of the machine by which the chassis may be deflected from a straight path of travel, characterized by a sidedraft stabilizer, including a draft member for connection with a propelling unit, a yielding coupling connecting the chassis thereto for lateral shifting movement under influence of such unbalanced resistance to travel motion, a brake mechanism for one wheel of the chassis and actuating means therefor operated by the movement of the chassis under influence of such unbalanced resistance.

3. An agricultural mower or the like of the type wherein a wheeled chassis carries a laterally extending outrigger type cutter bar against which is exerted an unbalanced resistance to travel motion of the machine by which the chassis may be deflected from a straight path of travel, characterized by a sidedraft stabilizer including a draft member for connection with a propelling unit yieldingly connected to the chassis enabling lateral shifting movement of the chassis relative to the propelling unit, a brake device for the chassis affording a counterbalancing resistance to the initially unbalanced resistance to travel motion under influence of which the chassis is deflected from its course, and an operating device for setting the brake device upon lateral shifting movement of the chassis relative to the propelling unit to resist said deflecting influence.

4. An agricultural mower or the like of the type wherein a wheeled chassis carries a laterally extending outrigger type cutter bar against which is exerted an unbalanced resistance to travel motion of the machine by which the chassis may be deflected from a straight path of travel, characterized by a sidedraft stabilizer including a draft member for pivotal connection with a propelling unit yieldingly connected to the chassis enabling lateral shifting movement of the chassis relative to the draft member and propelling unit, a brake device for the chassis affording a counterbalancing resistance to the initially unbalanced resistance to travel motion under influence of which the chassis is deflected from its course, and a brake operating device automatically actuated by the shifting movement of the chassis from its normal path of travel.

5. A traveling unit of the type wherein a laterally extending outrigger type portion is subject to unbalanced restraint of advance travel motion by which a lateral shifting tendency is imparted to the unit, including a draft member with which the unit has pivotal connection for relative oscillatory motion, and a normally inoperative unit retarding device energized by the initial oscillatory movement of the unit relative to the draft member to afford counter resistance to such movement and so minimize the deflection of the unit from its normal path of travel.

6. A traveling unit of the type wherein a laterally extending outrigger type portion is subject to unbalanced restraint of advance travel motion by which a lateral shifting tendency is imparted to the unit, including a draft member with which the unit has telescopic connection for relative movement, and a normally inoperative unit retarding device energized by the telescopic adjustment of the unit and draft device to afford counter resistance to lateral shifting tendency of the unit to minimize the deflection of the unit from its normal path of travel.

7. A side slip stabilizer for a wheeled unit subject to unbalanced resistance to travel motion by which side swinging motion is induced, including a draft connection to which the unit is connected for limited oscillatory motion, a brake mechanism for the unit, an actuating lever therefor located in the path of said oscillatory motion of the unit and a portion upon the unit making thrust engagement with the brake operating lever upon such oscillatory motion to automatically operate the lever to set the brake.

8. A stabilizing mechanism for a wheeled chassis of the type wherein a laterally extending outrigger section is subject to resistance to travel movement of the chassis in laterally offset relation with the line of travel of the chassis whereby the unit is subject to lateral deflecting influence from its course of travel, including a draft connection to which the chassis is connected for advance travel motion and for lateral swinging motion out of its normal course of travel under influence of unbalanced resistance to its advance travel motion, a chassis brake mechanism, and actuating means therefor operative by the deflection of the chassis from its prescribed path of travel to automatically increase the resistance of the chassis to such deflecting influence.

WILHELM VUTZ.

REFERENCES CITED

The following references are of record in the file of this patent:

UNITED STATES PATENTS

| Number | Name | Date |
| --- | --- | --- |
| 1,224,114 | Holt | Apr. 24, 1917 |
| 1,379,074 | Abern et al. | May 24, 1921 |
| 1,588,035 | Lawrence | June 8, 1926 |
| 1,638,854 | Johanson | Aug. 16, 1927 |
| 1,821,816 | Quaas | Sept. 1, 1931 |
| 1,942,235 | Boggio | Jan. 2, 1934 |
| 1,946,501 | Roggensack | Feb. 13, 1934 |
| 2,148,246 | Sanford | Feb. 21, 1939 |
| 2,174,464 | Givens | Sept. 26, 1939 |
| 2,311,859 | Oehler | Feb. 23, 1943 |

FOREIGN PATENTS

| Number | Country | Date |
| --- | --- | --- |
| 282,084 | Great Britain | Mar. 22, 1928 |